Jan. 14, 1964     A. DIXON     3,118,051
CONTROL FOR ARC WELDING

Filed March 19, 1957     3 Sheets-Sheet 1

United States Patent Office 3,118,051
Patented Jan. 14, 1964

3,118,051
CONTROL FOR ARC WELDING
Austin Dixon, Westmoreland City, Pa., assignor to Westinghouse Electric Corporation, East Pittsburgh, Pa., a corporation of Pennsylvania
Filed Mar. 19, 1957, Ser. No. 647,007
21 Claims. (Cl. 219—135)

This invention relates to the art of controlling arc welding and has particular relationship to the control of a sequence of timed operations which are carried out in producing an arc weld.

This invention relates to Patent 3,062,949, granted November 6, 1962, to John Lippert and Alfred W. Klein, filed concurrently herewith, and assigned to Westinghouse Electric Corporation (hereinafter called Lippert application). The Lippert application discloses apparatus and a method for joining a tube to a tube sheet or plate by arc welding with a non-consumable electrode in a shield of gas. In accordance with the Lippert invention, the electrode is precisely positioned with reference to the junction between the tube and the sheet, a welding arc is fired between the electrode and the junction, and the electrode is moved around the junction while its position (that is, its angular position and its distance from the joint) is maintained, thus carrying the arc around the junction and producing a peripheral weld. The welding of a tube to a sheet as disclosed by Lippert requires that a number of components of apparatus be operated in a predetermined manner and in a predetermined timed relationship, and it is an object of this invention to provide a method and timing means for so operating components of tube-to-sheet welding apparatus as to produce effectively sound seal welds between tubes and a sheet.

Specifically, in the welding of tubes to a sheet the following principal components of apparatus are used.

(1) A gun including the electrode and means for moving the electrode around the junction between a tube and the sheet.

(2) A power supply unit for supplying energy to the welding arc.

(3) A high frequency stabilizer.

(4) Shielding gas supply means.

It is a specific object of this invention to provide a method for so operating the above-listed components of tube-to-sheet welding apparatus and particularly like components of a Lippert system as to produce effectively vacuum-tight seal welds between a plurality of tubes and a sheet, and it is another specific object of this invention to provide a sequence timer for sequencing and timing the operation.

In welding a tube to a sheet as taught by Lippert it is desirable that at the end of each welding interval the arc current be tapered off at a predetermined rate, and it is a further specific object of this invention to provide novel apparatus for tapering off the arc current at a predetermined rate.

In accordance with this invention a sequence timer is provided which includes a plurality of relays so connected as to produce the desired sequence. The timer includes a member of timing relays which provide the necessary timing. The sequence timer is tied into the tube-to-sheet welding apparatus in such manner as to actuate the various components of the apparatus in timed relationship to produce the joint most propitiously. The apparatus in accordance with this invention also includes an arc-current taper control unit which is connected to the sequence timer and the components of the tube-to-sheet welding apparatus in such manner as to produce the desired arc-current tapering.

Specifically, the following sequence is carried out in accordance with this invention in sealing a tube in a sheet.

(1) Initially the flow of shielding gas is started to prepurge the junction of undesired surface gases.

(2) A first predetermined time interval after the flow of gas is started, potential from the power supply unit is impressed between the electrode and the junction and in addition the high-frequency stabilizer is actuated to impress the high frequency field or spark between the electrode and the junction. The cooperation of the potential and the field or spark causes an arc to be fired between the electrode and the junction.

(3) A second predetermined time interval after the potential and the stabilizing field or spark are impressed between the electrode and the junction, the movement of the electrode about the junction between the tube and the sheet is started. This second time interval may be relatively short; it need be only sufficiently long to assure that the arc melts the material at the junction at the point where the arc is first fired.

(4) A third predetermined time interval after the arc is fired the high frequency stabilizer is deenergized.

(5) The operation of the arc current tapering unit is initiated to reduce the arc current at a predetermined rate. This operation may be carried out before, at the same time as, or after the stabilizer is deenergized.

(6) A fourth predetermined time interval after the arc current is tapered off the supply of potential between the electrode and the junction from the supply unit may be interrupted. This time interval may be so long that the interruption takes place after the arc has tapered to extinction.

(7) After the supply of the potential is interrupted the movement of the electrode is stopped.

(8) The shielding gas continues to flow for a fifth predetermined time interval after the supply of potential is interrupted to postpurge the weld and the welding electrode.

The power supply unit preferably used in tube-to-sheet welding is of the type including a variable reactor for controlling the magnitude of the potential impressed between the electrode and the work. The reactance of this reactor is varied by increasing or decreasing the current through a direct-current winding of the reactor by varying the magnitude of resistance in series with the direct current supply. In accordance with this invention, the resistance is connected to a piston in a cylinder which is supplied with air controlled so that the resistance is varied. The air flow is controlled by a valve which as desired, is controlled from a sequence timer to produce the desired rate of variation of the resistance and thus of the reactance in the power supply unit.

The novel features considered characteristic of this invention are disclosed generally above. The invention itself both as to its organization and its method of operation, together with additional objects and advantages thereof, will be understood from the following description of a specific embodiment when read in connection with the accompanying drawings, in which.

*Description*

Figure 1:
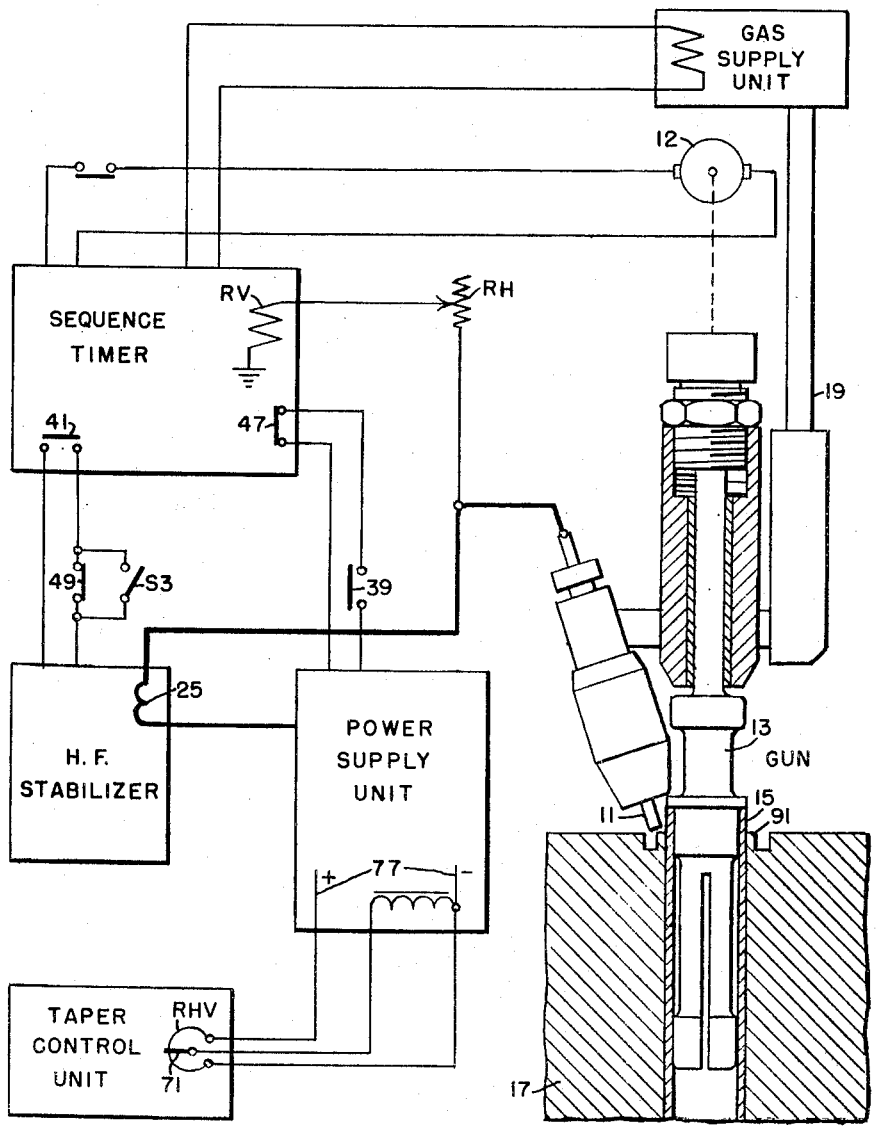
FIGURE 1 is a diagrammatic view showing the principal components of the tube-to-sheet welding apparatus in accordance with this invention.
Figure 2:
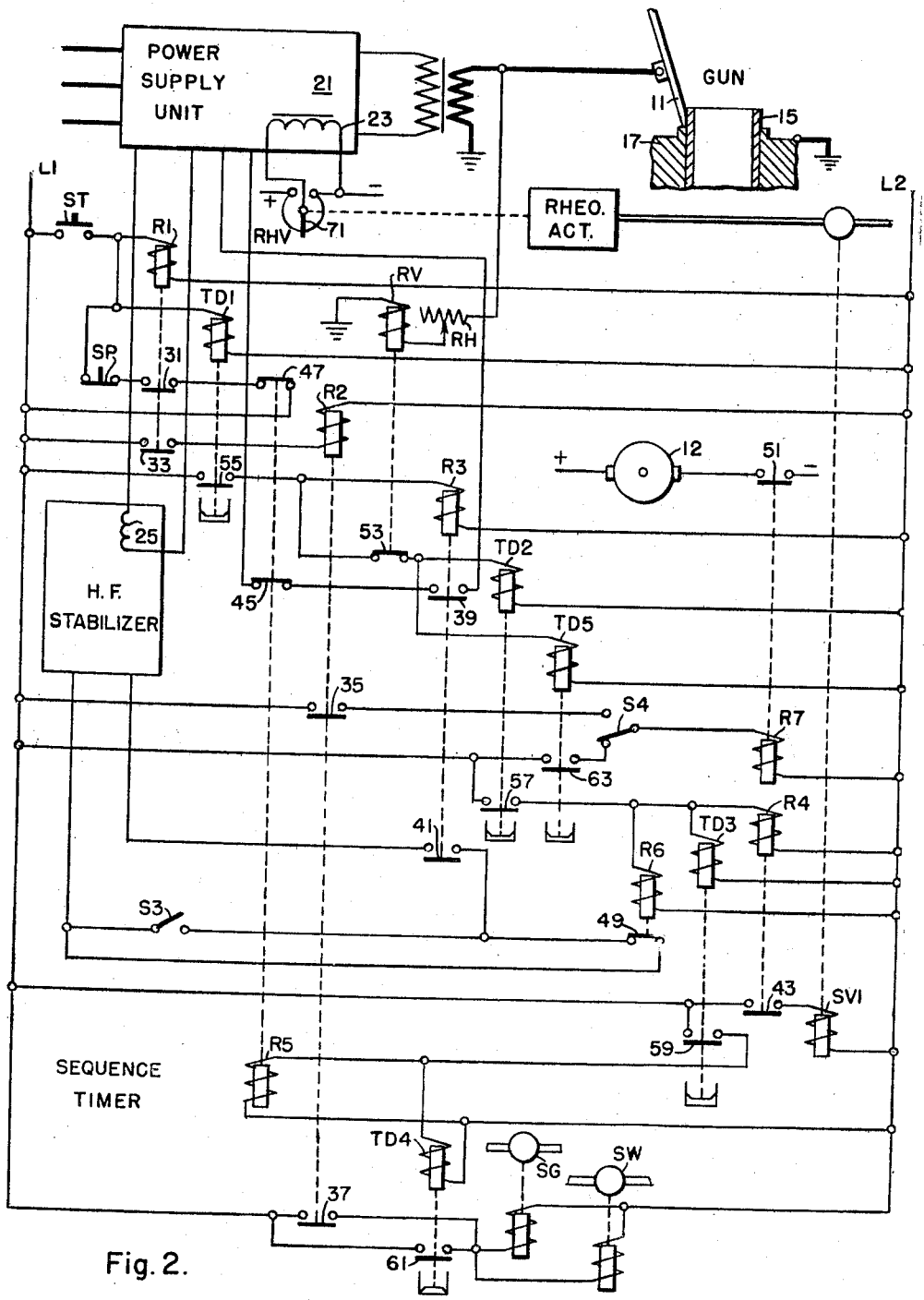
FIG. 2 is a circuit diagram showing in detail a preferred embodiment of this invention.

The apparatus shown in FIG. 1 includes a Gun as disclosed in the Lippert application. This Gun includes an electrode 11 mounted so that it may be rotated by a motor 12 on a mandrel 13 in a tube 15 which is to be welded to a tube sheet or plate 17 as disclosed by Lippert. The Gun includes a gas conducting channel 19 which is adapted to be supplied from a Gas Supply Unit. In addition, this apparatus includes a Power Supply Unit, a High Frequency or H.F. Stabilizer, Sequence Timer and Taper Control Unit.

The Power Supply Unit may be of any suitable type available in the art and should preferably include a reactor 21 for varying the welding current having a direct current winding 23. The magnitude of the direct current flowing in this winding 23 determines the reactance of the reactor 21 and the output potential of the Power Supply Unit. The Power Supply Unit is connected to the electrode 11 at one terminal and is preferably grounded at the other. Since the work 15—17 is grounded, a potential may thus be established between the electrode 11 and the work 15—17.

The H.F. Stabilizer may be of any type available in the art. Such a Stabilizer as a rule must satisfy Federal Communication Commission requirements. The Stabilizer is also connected between the electrode and the work. Usually its output component, which may be an output coil 25 of low impedance, is connected in series between the Power Supply Unit and the welding electrode 11.

The Sequence Timer includes a plurality of instantaneous relays R1, R2, R3, R4, R5, R6 and R7 and a plurality of time delay relays TD1, TD2, TD3, TD4 and TD5. In addition, the Timer includes a pair of solenoids SG and SW, one actuable to open the valve of the Gas Supply Unit and the other actuable to open the cooling-water supply valve in situations in which cooling water is used. This Sequence Timer also includes a voltage responsive relay RV adapted to be connected between the electrode and the work through a variable resistor RH. This relay RV is actuable by a voltage exceeding appreciably the voltage of a welding arc. It becomes deenergized if the voltage between its terminals drops to the magnitude of the welding arc voltage. The Sequence Timer also includes a start switch ST and a stop switch. In addition, there are selector switches S3 and S4.

The relay R1 has a pair of normally open contacts 31 and 33. The relay R2 has a pair of normally open contacts 35 and 37. The relay R3 has a pair of normally open contacts 39 and 41. The relay R4 has one normally open contact 43. The relay R5 has a pair of normally closed contacts 45 and 47. The relay R6 has a normally closed contact 49. The relay R7 has a normally open contact 51. The relay RV has a normally closed contact 53.

The relay TD1 has a normally open contact 55 which is closed a predetermined time interval after the relay TD1 is energized, but drops out in a very short time interval after the relay is deenergized. The relay TD2 has a normally open contact 57 which is closed a predetermined time interval after the relay is energized and drops out immediately after the relay TD2 is deenergized. The relay TD3 has a normally open contact 59 which operates similarly to the relays TD1 and TD2. The relay TD4 has a normally open contact 61 which closes immediately when this relay is energized, but drops out a predetermined time interval after the relay TD4 is deenergized. The relay TD5 has a normally open contact 63 which closes a predetermined time interval after the relay is energized but drops out immediately when the relay TD5 is deenergized.

The Sequence Timer may be supplied from conductors L1 and L2, which may be connected to the terminals of 115 volt alternating current commercial supply through the usual disconnects or circuit breakers (not shown). The coils of relays R1 and TD1 are adapted to be connected between conductors L1 and L2 through the start switch ST. These coils are also adapted to be connected between the conductors L1 and L2 through normally open contact 31 of relay R1, the normally closed contact 47 of relay R5, and a stop push button SP. Actuation of relay R1 thus locks in relays R1 and TD1 independently of the start switch ST until either the normally closed contact 47 of relay R5 is opened or stop switch SP is opened.

The coil of relay R2 is adapted to be connected between conductors L1 and L2 through the other normally open contact 33 of relay R1. The coil of relay R3 is adapted to be connected between conductors L1 and L2 through the normally open contact 55 of relay TD1. The coils of relays TD2 and TD5 are adapted to be connected between conductors L1 and L2 through the normally open contact 55 of TD1 and the normally closed contact 53 of RV. The coil of relay R7 is adapted to be connected between conductors L1 and L2 through the normally open contact 35 of relay R2 and through selector switch S4 when the latter is closed in series with 35. The coil of relay R7 is also adapted to be connected between conductors L1 and L2 through the normally open contact 63 of relay TD5 and the selector switch S4 in the other position. The coils of relays R4, R6 and TD3 are adapted to be connected between conductors L1 and L2 through the normally open contact 57 of relay TD2. The coils of relays R5 and TD4 are adapted to be connected between conductors L1 and L2 through a normally open contact 59 of TD3. The coils of the solenoids SG and SW are adapted to be connected between conductors L1 and L2 alternatively either through a normally open contact 37 of relay R2 or through a normally open contact 61 of relay TD4. These coils are then actuated either if R2 is actuated or if TD4 is actuated and so long as the latter remains actuated. The normally open contact 43 of relay R4 connects a solenoid SV1 which controls the supply of air in the Taper Control Unit between conductors L1 and L2.

The normally open contact 39 of relay R3 and the normally closed contact 45 of relay R5 are connected in series with a contactor (not shown) of the Power Supply Unit and control the energization of this Unit. When relay R3 is actuated and R5 is unactuated the Power Supply Unit is energized. When relay R3 is actuated and relay R5 is also actuated the Power Supply Unit is deenergized. When relay R3 is unactuated the Power Supply Unit is deenergized. The other normally open contact 43 of relay R3 and the normally closed contact 49 of relay R6 are connected in series with the HF Stabilizer. When relay R3 is actuated and R6 unactuated, the Stabilizer is energized. When relay R3 is actuated and R6 is actuated, the Stabilizer is deenergized. When relay R3 is unactuated, the Stabilizer is deenergized. Relay R6 may be shunted out by the selector switch S3. The normally open contact of relay R7 is adapted to connect the motor 12 which drives the gun G to rotate the electrode 11 to direct current power supply terminals which may be supplied from conductors L1 and L2.

In a Sequence Timer which has been constructed and found to operate satisfactorily, the relays R1, R2, R3, R4, R5, R6 and R7 are of the alternating current type sold under the designation 964B by Advance. Relays TD1 and TD3 are of the type sold under the designation R09D by Square D Company. Relay TD2 is of the type sold under the designation 2805 by Automatic Temperature Control Company. Relay TD4 is of the type sold by Square D Company under the designation R09E. The solenoids SG and SW are both of the type sold by the Automatic Switch Company under the designation 80301. This information is presented here for the purpose of aiding those skilled in the art in practicing this invention and not with an intention of in any respect limiting the scope of this invention.

Figure 3:
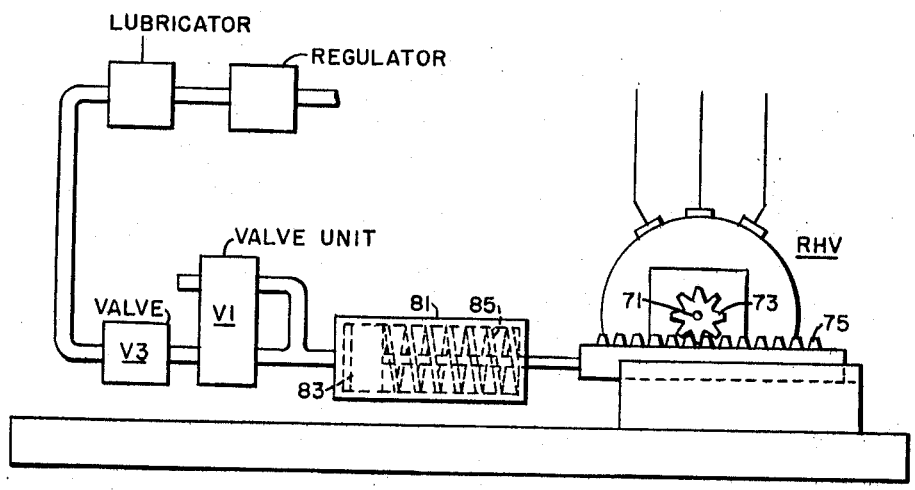
FIG. 3 is a diagrammatic view showing an arc current tapering control device in accordance with this invention.

The Taper Control Unit (FIG. 3) includes a variable resistor RHV having a movable arm 71. This arm is connected to a pinion 73 which is actuable by a rack 75 and the arm 71 may be set by the movement of the rack. The variable resistor is connected in circuit with a direct current supply 77 and the direct current windings 23 of the reactor 21 in the Power Supply Unit. This circuit extends from the positive terminal of the supply to one terminal of the variable resistor RHV through a portion of the variable resistor to the adjustable arm 71, the direct current winding 21 to the negative terminal of the supply 77. The supply 77 is thus connected across the variable resistor RHV so that the adjustable arm functions to divide the voltage across the variable resistor to an extent dependent on the setting of the arm 71.

The Taper Control Unit also includes an air cylinder 81 including a spring actuated piston 83. The piston is connected to the rack 75. The spring 85 which acts on the piston tends to move the piston in a direction such as to maintain the rack 75 at one of its extreme positions. The force of the spring may be counteracted by air adapted to be supplied through a regulator, a lubricator, an adjustable valve V3 which may be set to control the speed and a solenoid actuable valve unit V1. The unit V1 is of the three-way type. With the solenoid unactuated the unit V1 permits the air from the cylinder 81 to be exhausted. Thus, the piston is movable under the action of the spring in such a sense as to set the rack in its initial extreme position in which the voltage impressed on winding 21 is a maximum. With the solenoid V1 actuated the exhaust is closed and the connection to valve V3 is opened so that air may flow at a speed determined by V3 into the cylinder 81 to move the piston 83 and the rack 75 from its initial extreme position to a position in which the current supplied to winding 23 is lower than for the extreme position.

The regulator is in a typical actuator of the type regulating the air pressure between 80 pounds and 30 pounds. The regulator and the lubricator may be purchased from Wesco Machine Products Inc. of 1682 Foulkrad Street, Philadelphia 24, Pennsylvania. The valve V1 is of the 110 volt, 60 cycle alternating current type made by Beckett Harcum and designated as a three-way valve ⅛ inch type BVP–1. Valve V3 is a speed control valve designated #2 sold by Mead Company. The air cylinder is sold by Mead Company under the designation type HIX–23 (2 to 3 inch horizontal stroke).

This information is presented with the intention of aiding those skilled in the art in practicing this invention and not with intention of in any way limiting the scope of this invention.

Stand-By

In the stand-by condition of the apparatus the circuit breaker (not shown) for the apparatus is closed and power is supplied to the conductors L1 and L2. But starting switch ST is open so that relays R1, TD1, R2, R3, TD2, TD5, R7, R4, R6, TD3, R5, TD4 and solenoids SG, SW and SV1 are deenergized. Under such circumstances, the Power Supply Unit and the H.F. Stabilizer are also deenergized. Relay RV is deenergized and its normally closed contact 53 is closed. The motor 12 which drives the Gun is deenergized and the Gun is at rest.

The Sequence Timer may be operated in several ways. With the switch S4 in the position shown in the drawing the relay R7 is actuated only after the relay TD5 is actuated. Since the relay R7 controls the supply of power to the motor 12, the rotation of the electrode 11 can start only after the arc is fired with the switch in the position shown. With the switch S4 in the other position, rotation may be started independently of the arc. With the switch S3 open, as shown, the normally closed contact 49 of R6 controls the operation of the H.F. Stabilizer in impressing a high frequency field or spark between the electrode 11 and the tube 15 and sheet 17. The opening of the contact 49 would then interrupt this field or spark. With the switch S3 closed the field or spark is impressed independently of the relay R6.

Operation

In the operation of the apparatus the tube 15 is rolled into the sheet 17 so that the shoulder 91 around the opening of the sheet abuts the tube 15 and the electrode 11 is positioned as described in the Lippert application with reference to the junction between the tube 15 and the sheet 17. It may now be assumed that the operation desired is of the type which demands that the switches S4 and S3 be in the positions shown.

To initiate the welding operation, the start switch ST is closed. This actuated relay R1 immediately. Relay TD1 becomes energized but is actuated only after a predetermined time interval. The actuation of relay R1 causes relay R2 to be actuated. The gas solenoid SG is now actuated and shielding gas is supplied to the Gun. The water solenoid SW may also be actuated, and in situations in which the Gun is provided with cooling channels, cooling water would also be supplied. The actuation of relay R2 has no other effect since switch S4 is set in a position such that the contact 35 of relay R2 is disconnected from the coil of R7.

After an adequate prepurge interval during which the gas purges, the junction of the tube 15 and sheet 17 from undesired gases, relay TD1 is actuated. This causes the H.F. Stabilizer and the Power Supply Unit to be energized. The energization of the Power Supply Unit produces a substantial potential between the electrode 11 and the work 15–17 so that relay RV is actuated, opening its normally closed contact 53 to prevent actuation of relays TD2 and TD5. But with the H.F. Stabilizer being energized, an arc is fired in a short time interval between the electrode 11 and the work 15–17, and the melting of the shoulder 91 of the sheet 17 at the junction starts. Once the arc is fired, the potential across the electrode 11 and the work 15–17 is reduced so that relay RV is deenergized and its normally closed contact 53 recloses. Relays TD2 and TD5 are now energized. After a predetermined time interval which is sufficient to assure that the work is melted, the contact 63 of relay TD5 closes energizing relay R7 and starting the rotation of the electrode 11. The electrode now rotates at a speed such as to produce the desired welding operation.

After the electrode 11 has rotated through an angle which may be of the order of 375° in a typical situation and has caused the metal of the shoulder 91 of the sheet 17 to be fused into the tube 15, relay TD2 is actuated. This immediately causes relays R4 and R6 to be actuated and conditions TD3 to be actuated. The actuation of relay R6 opens the Stabilizer circuit deenergizing the Stabilizer. The actuation of relay R4 energizes solenoid SV1 to actuate the valve V1 in the Taper Control Unit so that the piston and the rack connected to it are moved at a rate determined by the setting of the valve V3. The movement of the pinion connected to the rack is now such that the impedance of the reactor 23 in the Power Supply Unit is increased at a predetermined rate tapering off the current at this rate. This tapering-off operation takes place while the electrode is being rotated and the electrode continues to rotate as the current tapers off. At the end of the tapering interval during which the electrode may have rotated through another 360° in a typical actuator, relay TD3 is actuated, actuating relays R5 and TD4. TD4 is immediately actuated providing a holding circuit for the solenoids SG and SW. The actuation of relay R5 causes its normally closed contacts 45 and 47 to open. This deenergizes the Power Supply Unit so that there is no longer a potential between the electrode 11 and the work 15–17. In addition, relays R1 and TD1 are deenergized. The deenergization of relay R1 causes R2 to be deenergized, but this has no effect on the solenoids SG and SW which are maintained energized through the contact of relay TD4. The deenergization of relay TD1 causes R3, TD2 and TD5 to be deenergized. Relay R7 is then deenergized to stop the rotation of the electrode 11 and relays R4, TD3 and R6 are deenergized to reset the Sequence Timer for another operation. Solenoid SV1 is then deenergized so that valve V1 is set in a position such as to permit exhaust of the cylinder and the piston and rack return to the initial position. In addition, relays R5 and TD4 are deenergized. The deenergization of relay R5 is a resetting operation. Relay TD4 remains actuated until the wielded joint has been postpurged. The operation is now completed.

The operation with the switch S4 of the Sequence Timer set in the other position is to a large extent similar to the operation just described. The principal difference is that relay R7 is actuated on actuation of the relay R2, and the rotation of the electrode thus starts before a welding arc is fired. With the switch S3 closed, the HF Stabilizer is maintained energized throughout the welding operation and is only deenergized when during resetting the relay R3 is deenergized.

Conclusion

While a preferred embodiment of this invention has been disclosed herein, many modifications thereof are feasible. This invention, therefore, is not to be restricted except insofar as is necessitated by the spirit of the prior art.

I claim as my invention:

1. The method of joining a tube to a sheet with a precision circumferential filet-like joint, fusing only a predetermined amount of metal at said joint to form a weld by non-consumable-electrode gas-shielded arc welding with apparatus including movable gun means adapted to support said electrode in welding relationship with said tube and sheet, arc welding power supply means for impressing a potential between said electrodes and said tube and sheet, high frequency arc stabilizing means for impressing a high frequency stabilizing electro-magnetic field between said gun and sheet, and means for supplying shielding gas to said arc, the said method comprising setting said electrode in welding relationship with, but spaced from, the joint between said tube and sheet in the region where the weld is to be produced, said electrode being spaced a predetermined distance from said joint, actuating said gas supply means to initiate the flow of shielding gas to prepurge the region of the weld, a first predetermined time interval after the initiation of said flow, and while said electrode is spaced from said joint, actuating said power supply means to cause said potential to be impressed between said electrode and said tube and sheet and actuating said high-frequency stabilizing means to impress said field between said electrode and said tube and sheet, a welding arc being produced between said electrode and tube and sheet by the cooperation of said power supply means and said stabilizing means, at least a second predetermined time interval after the impressing of said potential, and while said electrode is spaced from said joint, actuating said gun means to initiate the movement of said electrode about the joint between said tube and sheet, a third predetermined time interval after initiation of said movement, actuating said stabilizing means to interrupt said field, a fourth predetermined time interval after the initiation of said movement actuating said power supply means to reduce the current of said arc, a fifth predetermined time interval after the reduction of said current actuating said power supply means to interrupt the arc, a sixth predetermined time interval after the interruption of said arc actuating said gun means to stop said movement and a seventh predetermined time interval after the interruption of said arc actuating the gas supply means to stop said flow of gas.

2. The method of joining a tube to a sheet with a precision circumferential filet-like joint, fusing only a predetermined amount of metal at said joint to form a weld by non-consumable-electrode gas-shielded arc welding with apparatus including movable gun means adapted to support said electrode in welding relationship with said tube and sheet, arc welding power supply means for impressing a potential between said electrode and said tube and sheet, high frequency arc stabilizing means for impressing a high frequency stabilizing electro-magnetic field between said gun and sheet, and means for supplying shielding gas to said arc, the said method comprising setting said electrode in welding relationship with, but spaced from, the joint between said tube and sheet in the region where the weld is to be produced, said electrode being spaced a predetermined distance from said joint, actuating said gas supply means to initiate the flow of shielding gas to prepurge the region of the weld, a first predetermined time interval after the initiation of said flow, and while said electrode is spaced from said joint, actuating said power supply means to cause said potential to be impressed between said electrode and said tube and sheet and actuating said high-frequency stabilizing means to produce said field between said electrode and said tube and sheet, a welding arc being fired between said electrode and tube and sheet by the cooperation of said power supply means and said stabilizing means, at least a second predetermined time interval after said welding arc has been fired, and while said electrode is spaced from said joint, actuating said gun means to initiate the movement of said electrode about the joint between said tube and sheet, a third predetermined time interval after said welding arc has been fired, actuating said stabilizing means to interrupt said field, a fourth predetermined time interval after said welding arc has been fired actuating said power supply means to reduce the current of said arc, a fifth predetermined time interval after the reduction of said current actuating said power supply means to interrupt the arc, a sixth predetermined time interval after the interruption of said arc actuating said gun means to stop said movement and a seventh predetermined time interval after the interruption of said arc actuating the gas supply means to stop said flow of gas.

3. The method of joining a tube to a sheet with a precision circumferential filet-like joint, fusing only a predetermined amount of metal at said joint to form a weld by non-consumable-electrode gas-shielded arc welding with apparatus including movable gun means adapted to support said electrode in welding relationship with said tube and sheet, arc welding power supply means for impressing a potential between said electrode and said tube and sheet, high frequency arc stabilizing means for impressing a high frequency stabilizing electro-magnetic field between said gun and sheet, and means for supplying shielding gas to said arc, the said method comprising setting said electrode in welding relationship with, but spaced from, the joint between said tube and sheet in the region where the weld is to be produced, said electrode being spaced a predetermined distance from said joint, actuating said gas supply means to initiate the flow of shielding gas to prepurge the region of the weld, a first predetermined time interval after the initiation of said flow, and while said electrode is spaced from said joint, actuating said power supply means to cause said potential to be impressed between said electrode and said tube and sheet and actuating said high-frequency stabilizing means to produce said field between said electrode and said tube and sheet, a welding arc being fired between said electrode and tube and sheet by the cooperation of said power supply means and said stabilizing means, at least a second predetermined time interval after the impressing of said potential, and while said electrode is spaced from said joint, actuating said gun means to initiate the movement of said electrode about the joint between said tube and sheet, a third predetermined time interval after the initiation of said movement actuating said power supply means to reduce the current of said arc, a fourth predetermined time interval after the reduction of said current actuating said power supply means to interrupt the arc, and actuating said stabilizing means to interrupt said field, a fifth predetermined time interval after the interruption of said arc actuating said gun means to stop said movement and a sixth predetermined time interval after the interruption of said arc actuating the gas supply means to stop said flow of gas.

4. The method of joining a tube to a sheet with a precision circumferential filet-like joint, fusing only a predetermined amount of metal at said joint to form a weld by non-consumable-electrode gas-shielded arc welding with apparatus including movable gun means adapted to support said electrode in welding relationship with said tube and sheet, arc welding power supply means for impressing a potential between said electrode and said tube and sheet, high frequency arc stabilizing means for impressing a high frequency stabilizing electro-magnetic field between said gun and sheet, and means for supplying shielding gas to said arc, the said method comprising setting said electrode in welding relationship with, but spaced from, the joint between said tube and sheet in the region where the weld is to be produced, said electrode being spaced a predetermined distance from said joint, actuating said gas supply means to initiate the flow of shielding gas to prepurge the region of the weld and actuating said gun means to initiate movement of said electrode about the joint between said tube and sheet, a first predetermined time interval after the initiation of said flow, and while said electrode is spaced from said joint, actuating said power supply means to cause said potential to be impressed between said electrode and said tube and sheet and actuating said high frequency stabilizing means to produce said field between said electrode and said tube and sheet, a welding arc being fired between said electrode and tube and sheet by the cooperation of said power supply means and said stabilizing means, at least a second predetermined time interval after the impressing of said potential, and while said electrode is spaced from said joint, actuating said stabilizing means to interrupt said field, a third predetermined time interval after the impressing of said potential actuating said power supply means to reduce the current of said arc, a fourth predetermined time interval after the reduction of said current actuating said power supply means to interrupt the welding arc, a fifth predetermined time interval after the interruption of said arc actuating said gun means to stop said movement and a sixth predetermined time interval after the interruption of said arc actuating the gas supply means to stop said flow of gas.

5. The method of joining a tube to a sheet with a precision circumferential filet-like joint, fusing only a predetermined amount of metal at said joint to form a weld by non-consumable-electrode gas-shielded arc welding with apparatus including movable gun means adapted to support said electrode in welding relationship with said tube and sheet, arc welding power supply means for impressing a potential between said electrode and said tube and sheet, high frequency arc stabilizing means for impressing a high frequency stabilizing electro-magnetic field between said gun and sheet, and means for supplying shielding gas to said arc, the said method comprising setting said electrode in welding relationship with, but spaced from, the joint between said tube and sheet in the region where the weld is to be produced, said electrode being spaced a predetermined distance from said joint, actuating said gas supply means to initiate the flow of shielding gas to prepurge the region of the weld and actuating said gun means to initiate movement of said electrode about the joint between said tube and sheet, a first predetermined time interval after the initiation of said flow, and while said electrode is spaced from said joint, actuating said power supply means to cause said potential to be impressed between said electrode and said tube and sheet and actuating said high frequency stabilizing means to produce said field between said electrode and said tube and sheet, a welding arc being fired between said electrode and tube and sheet by the cooperation of said power supply means and said stabilizing means, at least a second predetermined time interval after the impressing of said potential, and while said electrode is spaced from said joint, actuating said power supply means to reduce the current of said arc, a third predetermined time interval after the reduction of said current actuating said power supply means to interrupt the arc and actuating said stabilizing means to interrupt said field, a fourth predetermined time interval after the interruption of said arc actuating said gun means to stop said movement and a fifth predetermined time interval after the interruption of said arc actuating the gas supply means to stop said flow of gas.

6. In apparatus for joining a tube to a sheet by non-consumable-electrode gas-shielded arc welding including movable gun means adapted to support said electrode in welding relationship with said tube and sheet, arc-welding power supply means, high frequency arc stabilizing means, and gas supply means, a sequence timer comprising in combination selectively actuable switch means, means connected to said switch means and responsive to actuation thereof for actuating said gas supply means to supply shielding gas to said gun, first timing means connected to said switch means and responsive to actuation thereof for actuating said power supply means to impress an arc welding potential and to actuate said stabilizing means to impress a stabilizing potential between said electrode and said tube and sheet a first predetermined time interval after actuation of said switch means, the impressing of said welding arc and stabilizing potentials firing an arc between said electrode and tube and sheet, second timing means to be connected to said electrode and tube and sheet and responsive to a welding arc between said electrode and tube and sheet for actuating said gun means to start movement of said electrode about the joint between said tube and sheet, third timing means connected to said first timing means and to be connected to said electrode and tube and sheet and to said power supply means and responsive to a welding arc between said electrode and tube and sheet for actuating said power supply means to reduce the current of said arc a third predetermined interval after the firing of said arc and for actuating said arc stabilizing means to interrupt said stabilizing potential, fourth timing means connected to said third timing means for actuating said power supply means to interrupt the impressing of said potential a fourth predetermined interval after said actuation of said power supply means to reduce the current of said arc, fifth timing means connected to said third timing means for actuating said gun to stop said movement of said electrode a fifth predetermined time interval after said actuation of said power supply means to reduce the current of said arc, and sixth timing means connected to said fourth timing means for actuating said gas supply means to interrupt the supply of gas a sixth predetermined time interval after said actuation of said power supply means to interrupt said impressing of said potential.

7. In apparatus for joining a tube to a sheet by non-consumable-electrode gas-shielded arc welding including movable gun means adapted to support said electrode in welding relationship with said tube and sheet, arc-welding power supply means, high frequency arc stabilizing means, and gas supply means, a sequence timer comprising in combination selectively actuable switch means, means connected to said switch means and responsive to actuation thereof for actuating said gas supply means to supply shielding gas to said gun, first timing means connected to said switch means and responsive to actuation thereof for actuating said power supply means to impress a welding arc potential and to actuate said stabilizing means to impress a stabilizing potential between said electrode and said tube and sheet a first predetermined time interval after actuation of said switch means, the impressing of said welding arc and stabilizing potentials firing an arc between said electrode and tube and sheet, second timing means connected to said first timing means for actuating said gun means to start movement of said electrode about the joint between said tube and sheet, third timing means connected to said first timing means and connected to said power supply means for actuating said power supply means to reduce the current of said arc a third predetermined interval after the firing of said arc and for actuating said arc stabilizing means to interrupt said stabilizing potential, fourth timing means connected to said third timing means for actuating said power supply means to interrupt the impressing of said potential a fourth predetermined interval after said actuation of said power supply means to reduce the current of said arc, fifth timing means connected to said third timing means for actuating said gun to stop said movement of said electrode a fifth predetermined time interval after said actuation of said power supply means to reduce the current of said arc, and sixth timing means connected to said fourth timing means for actuating said gas supply means to interrupt the supply of gas a sixth predetermined time interval after said actuation of said power supply means to interrupt said impressing of said potential.

8. In apparatus for joining a tube to a sheet by non-consumable-electrode gas-shielded arc welding including movable gun means adapted to support said electrode in welding relationship with said tube and sheet, arc-welding power supply means, high frequency arc stabilizing means, and gas supply means, a sequence timer comprising in combination selectively actuable switch means, means connected to said switch means and responsive to actuation thereof for actuating said gas supply means to supply shielding gas to said gun, first timing means connected to said switch means and responsive to actuation thereof for actuating said power supply means to impress welding arc potential and to actuate said stabilizing means to impress a stabilizing potential between said electrode and said tube and sheet a first predetermined time interval after actuation of said switch means, the impressing of said welding arc and stabilizing potentials firing an arc between said electrode and tube and sheet, second timing means connected to said first timing means for actuating said gun means to move said electrode about the joint between said tube and sheet, third timing means connected to said first timing means and connected to said power supply means for actuating said power supply means to reduce the current of said arc a third predetermined interval after the firing of said arc, fourth timing means connected to said third timing means for actuating said power supply means to interrupt the impressing of said potential a fourth predetermined interval after said actuation of said power supply means to reduce the current of said arc, fifth timing means connected to said third timing means for actuating said stabilizing means to interrupt said stabilizing potential a fifth predetermined interval after said actuation of said power supply means to reduce said current of said arc, sixth timing means connected to said third timing means for actuating said gun to stop said movement of said electrode a sixth predetermined time interval after said actuation of said power supply means to reduce the current of said arc, and seventh timing means connected to said fourth timing means for actuating said gas supply means to interrupt the supply of gas a seventh predetermined time interval after said actuation of said power supply means to interrupt said impressing of said potential.

9. In apparatus for joining a tube to a sheet by non-consumable-electrode gas-shielded arc welding including movable gun means adapted to support said electrode in welding relationship with said tube and sheet, arc-welding power supply means, high frequency arc stabilizing means, and gas supply means, a sequence timer comprising in combination selectively actuable switch means, means connected to said switch means and responsive to actuation thereof for actuating said gas supply means to supply shielding gas to said gun, means connected to said switch means and responsive to actuation of said switch for actuating said gun means to initiate movement of said electrode about the joint between said tube and sheet, first timing means connected to said switch means and responsive to actuation thereof for actuating said power supply means to impress a welding arc potential and to actuate said stabilizing means to impress a stabilizing potential between said electrode and said tube and sheet a first predetermined time interval after actuation of said switch means, the impressing of said welding arc and stabilizing potential firing an arc between said electrode and tube and sheet, second timing means connected to said first timing means and to be connected to said electrode and tube and sheet and to said power supply means and responsive to a welding arc between said electrode and tube and sheet for actuating said power supply means to reduce the current of said arc a second predetermined interval after the firing of said arc and for actuating said arc stabilizing means to interrupt said stabilizing potential, third timing means connected to said second timing means for actuating said power supply means to interrupt the impressing of said potential a third predetermined interval after said actuation of said power supply means to reduce the current of said arc, fourth timing means connected to said second timing means for actuating said gun to stop said movement of said electrode a fourth predetermined time interval after said actuation of said power supply means to reduce the current of said arc, and fifth timing means connected to said fourth timing means for actuating said gas supply means to interrupt the supply of gas a fifth predetermined time interval after said actuation of said power supply means to interrupt said impressing of said potential.

10. Arc welding apparatus for welding work with a non-consumable electrode in a gaseous shield comprising power supply means, means connected to said power supply means for connecting said supply means to said electrode and work to impress a potential between said electrode and work to maintain a welding arc therebetween, and current tapering means including impedance varying means connected to said supply means for reducing the current of said arc at a predetermined rate at the end of a weld to suppress crater formation, said tapering means including pneumatic means connected to said impedance varying means for actuating said varying means to reduce said arc current at said rate.

11. Arc welding apparatus for welding work with a non-consumable electrode in a gaseous shield comprising power supply means, means connected to said power supply means for connecting said supply means to said electrode and work to impress a potential between said electrode and work to maintain a welding arc therebetween, and current tapering means including a variable resistor connected to said supply means for reducing the current of said arc at a predetermined rate at the end of a weld to suppress crater formation, said tapering means including pneumatic means connected to said variable resistor for actuating said variable resistor to reduce said arc current at said rate, said pneumatic means including a gas cylinder, a piston movable in said cylinder and valve means connected to said cylinder for controlling the movement thereof, said piston being connected to said resistor to vary the resistance of said resistor in accordance with the movement of said piston.

12. The method of joining a tube to a sheet with a precision circumferential filet-like joint, fusing only a predetermined amount of metal at said joint to form a weld by non-consumable-electrode gas-shielded arc welding with apparatus including movable gun means adapted to support said electrode in welding relationship with said tube and sheet, arc welding power supply means for impressing a potential between said electrode and said tube and sheet, and high frequency arc stabilizing means for impressing a high frequency stabilizing electromagnetic field between said gun and sheet, the said method comprising setting said electrode in welding relationship with, but spaced from, the joint between said tube and sheet in the region where the weld is to be produced, said electrode being spaced a predetermined distance from said joint, while said electrode is so spaced, actuating said power supply means to cause said potential to be impressed between said electrode and said tube and sheet and actuating said high-frequency stabilizing means to impress said field between said electrode and said tube and sheet, a welding arc being produced between said electrode and tube and sheet by the cooperation of said power supply means and said stabilizing means, at least a first predetermined time interval after the impressing of said potential, and while said electrode is so spaced, actuating said gun means to initiate the movement of said electrode about the joint between said tube and sheet, a second predetermined time interval after initiation of said movement, actuating said stabilizing means to interrupt said field, a third predetermined time interval after the initiation of said movement actuating said power supply means to reduce the current of said arc, a fourth predetermined time interval after the reduction of said current actuating said power supply means to interrupt the arc, and a fifth predetermined time interval after the interruption of said arc actuating said gun means to stop said movement.

13. The method of joining a tube to a sheet with a precision circumferential filet-like joint, fusing only a predetermined amount of metal at said joint to form a weld by non-consumable-electrode gas-shielded arc welding with apparatus including movable gun means adapted to support said electrode in welding relationship with said tube and sheet, arc welding power supply means for impressing a potential between said electrode and said tube and sheet, and high frequency arc stabilizing means for impressing a high frequency stabilizing electromagnetic field between said gun and sheet, the said method comprising setting said electrode in welding relationship with, but spaced from, the joint between said tube and sheet in the region where the weld is to be produced, said electrode being spaced a predetermined distance from said joint, while said electrode is so spaced, actuating said power supply means to cause said potential to be impressed between said electrode and said tube and sheet and actuating said high-frequency stabilizing means to impress said field between said electrode and said tube and sheet, a welding arc being produced between said electrode and tube and sheet by the cooperation of said power supply means and said stabilizing means, at least a first predetermined time interval after the impressing of said potential, and while said electrode is so spaced, actuating said gun means to initiate the movement of said electrode about the joint between said tube and sheet, a second predetermined time interval after the initiation of said movement actuating said power supply means to reduce the current of said arc, a third predetermined time interval after the reduction of said current actuating said power supply means to interrupt the arc, and a fourth predetermined time interval after the interruption of said arc actuating said gun means to stop said movement.

14. The method of joining a tube to a sheet with a precision circumferential filet-like joint, fusing only a predetermined amount of metal at said joint to form a weld by non-consumable-electrode gas-shielded arc welding with apparatus including movable gun means adapted to support said electrode in welding relationship with said tube and sheet, arc welding power supply means for impressing a potential between said electrode and said tube and sheet, and high-frequency arc stabilizing means for impressing a high-frequency stabilizing electromagnetic field between said gun and sheet, the said method comprising setting said electrode in welding relationship with, but spaced from, the joint between said tube and sheet in the region where the weld is to be produced, said electrode being spaced a predetermined distance from said joint, while said electrode is so spaced, actuating said power supply means to cause said potential to be impressed between said electrode and said tube and sheet and actuating said high-frequency stabilizing means to impress said field between said electrode and said tube and sheet, a welding arc being produced between said electrode and tube and sheet by the cooperation of said power supply means and said stabilizing means, at least a first predetermined time interval after the impressing of said potential, and while said electrode is so spaced, actuating said gun means to initiate the movement of said electrode about the joint between said tube and sheet, a second predetermined time interval after the initiation of said movement actuating said power supply means to interrupt the arc, and a third predetermined time interval after the interruption of said arc actuating said gun means to stop said movement.

15. In apparatus for joining a tube to a sheet by non-consumable-electrode gas-shielded arc welding including movable gun means adapted to support said electrode in welding relationship with said tube and sheet, arc-welding power supply means, and high-frequency arc stabilizing means, a sequence timer comprising in combination selectively actuable switch means, means connected to said switch means and responsive to actuation thereof for actuating said power supply means to impress an arc welding potential and to actuate said stabilizing means to impress a stabilizing potential between said electrode and said tube and sheet, the impressing of said welding arc and stabilizing potentials firing an arc between said electrode and tube and sheet, first timing means to be connected to said electrode and tube and sheet and responsive to a welding arc between said electrode and tube and sheet for actuating said gun means to start movement of said electrode about the joint between said tube and sheet a first time interval after the firing of said arc, second timing means connected to said impressing means and to be connected to said electrode and tube and sheet and to said power supply means and responsive to a welding arc between said electrode and tube and sheet for actuating said power supply means to reduce the current of said arc a second predetermined interval after the firing of said arc and for actuating said arc stabilizing means to interrupt said stabilizing potential, third timing means connected to said second timing means for actuating said power supply means to interrupt the impressing of said potential a third predetermined interval after said actuation of said power supply means to reduce the current of said arc, and fourth timing means connected to said second timing means for actuating said gun to stop said movement of said electrode a fourth predetermined time interval after said actuation of said power supply means to reduce the current of said arc.

16. In apparatus for joining a tube to a sheet by non-consumable-electrode gas-shielded arc welding including movable gun means adapted to support said electrode in welding relationship with said tube and sheet, arc-welding power supply means, and high-frequency arc stabilizing means, a sequence timer comprising in combination selectively actuable switch means, means connected to said switch means and responsive to actuation thereof for actuating said power supply means to impress an arc welding potential and to actuate said stabilizing means to impress a stabilizing potential between said electrode and said tube and sheet, the impressing of said welding arc and stabilizing potentials firing an arc between said electrode and tube and sheet, first timing means to be connected to said electrode and tube and sheet and responsive to a welding arc between said electrode and tube and sheet for actuating said gun means to start movement of said electrode about the joint between said tube and sheet a first predetermined time interval after the firing of said arc, second timing means connected to said impressing means and to be connected to said electrode and tube and sheet and to said power supply means and responsive to a welding arc between said electrode and tube and sheet for actuating said power supply means to reduce the current of said arc a second predetermined interval after the firing of said arc, third timing means connected to said second timing means for actuating said power supply means to interrupt the impressing of said potential a third predetermined interval after said actuation of said power supply means to reduce the current of said arc, and fourth timing means connected to said second timing means for actuating said gun to stop said movement of said electrode a fourth predetermined time interval after said actuation of said power supply means to reduce the current of said arc.

17. In apparatus for joining a tube to a sheet by non-consumable-electrode gas-shielded arc welding including movable gun means adapted to support said electrode in welding relationship with said tube and sheet, arc-welding power supply means, and high-frequency arc stabilizing means, a sequence timer comprising in combination selectively actuable switch means, means connected to said switch means and responsive to actuation thereof for actuating said power supply means to impress an arc welding potential and to actuate said stabilizing means to impress a stabilizing potential between said electrode and said tube and sheet, the impressing of said welding arc and stabilizing potentials firing an arc between said electrode and tube and sheet, first timing means to be connected to said electrode and tube and sheet and responsive to a welding arc between said electrode and tube and sheet for actuating said gun means to start movement of said electrode about the joint between said tube and sheet a first predetermined time interval after the firing of said arc, second timing means connected to said first timing means for actuating said power supply means to interrupt the impressing of said potential a second predetermined interval after said actuation of said power supply means to impress said potential, and third timing means connected to said first timing means for actuating said gun to stop said movement of said electrode a third predetermined time interval after said actuation of said power supply means to impress said potential.

18. Welding apparatus for arc welding a circular joint comprising an electrode for striking the arc from its tip, a support on which the electrode is rotatably mounted for rotation of its tip circumferentially about such joint, an electric motor for so rotating the electrode, circuit means for supplying the electrode with welding current comprising means for establishing and interrupting such supply, means for decreasing the welding current while being supplied to the electrode, circuit means for energizing said motor having provision for deenergizing it; and automatically operating control means for the enumerated circuit means for causing energization of said motor and the establishment of said supply of welding current to the electrode and, upon the electrode being rotated by said motor through a predetermined angular distance in excess of one revolution, and while the arc is being struck, operating said means which decreases the supply of welding current and while the electrode is still being rotated by said motor and, while the arc is still being struck by the decreased current, interrupting said current and deenergizing said motor; and circuit means for initiating operation of said automatically operating control means comprising a manually operated switch under the control of the operator.

19. Welding apparatus for arc welding a circular joint comprising an electrode for striking the arc from its tip, a support on which the electrode is rotatably mounted for rotation of its tip circumferentially about such joint, an electric motor for so rotating the electrode, circuit means for supplying the electrode with welding current comprising means for establishing an interrupting such supply, means for decreasing the welding current while being supplied to the electrode, circuit means for energizing said motor; and automatically operating control means for the enumerating circuit means for causing energization of said motor and the establishment of said supply of welding current to the electrode and, upon the electrode being rotated by said motor through a predetermined angular distance in excess of one revolution, and while the arc is being struck, operating said means which decreases the supply of welding current and, while the arc is still being struck by the decreased current and while the electrode is still being rotated by said motor, interrupting said current; and circuit means for initiating operation of said automatically operating control means comprising a manually operated switch under the control of the operator.

20. Arc welding apparatus for welding work with a non-consumable electrode in a gaseous shield comprising power supply means, means connected to said power supply means for connecting said supply means to said electrode and work to impress a potential between said electrode and work to maintain a welding arc therebetween, and current tapering means including impedance varying means connected to said supply means for reducing the current of said arc at a predetermined rate at the end of of a weld to suppress crater formation, said tapering means including fluid operable means connected to said impedance varying means for actuating said varying means to reduce said arc current at said rate.

21. The method of welding a precision circumferential filet-like joint between a tube and a plate fusing only a predetermined amount of metal at said joint to form said joint with a non-consumable electrode; which comprises setting said electrode in arc welding relationship with a starting point of said joint but spaced from said joint a predetermined distance, with said electrode stationary at said starting point and so spaced from said joint firing a welding arc by producing ionization in the gap between said electrode and joint and impressing arc supporting potential, after the material at said joint has been melted by the heat of said arc starting the movement of said electrode around said joint, and moving said electrode around said joint with said arc burning in such manner that a precision welded joint is produced.

References Cited in the file of this patent

UNITED STATES PATENTS

| 1,840,735 | Osborne | Jan. 12, 1932 |
| 1,949,251 | Gilbert | Feb. 27, 1934 |
| 2,151,378 | Elsey et al. | Mar. 21, 1939 |
| 2,152,785 | Blankenbuehler | Apr. 4, 1939 |
| 2,289,979 | Monn | July 14, 1942 |
| 2,510,205 | Baird | June 6, 1950 |
| 2,510,207 | Behnke et al. | June 6, 1950 |
| 2,717,948 | Cockrell et al. | Sept. 13, 1955 |
| 2,719,209 | Rebuffoni | Sept. 27, 1955 |
| 2,770,710 | Burkhart | Nov. 13, 1956 |
| 2,784,349 | Anderson | Mar. 5, 1957 |
| 2,817,745 | Pilia et al. | Dec. 24, 1957 |